Figure 1:
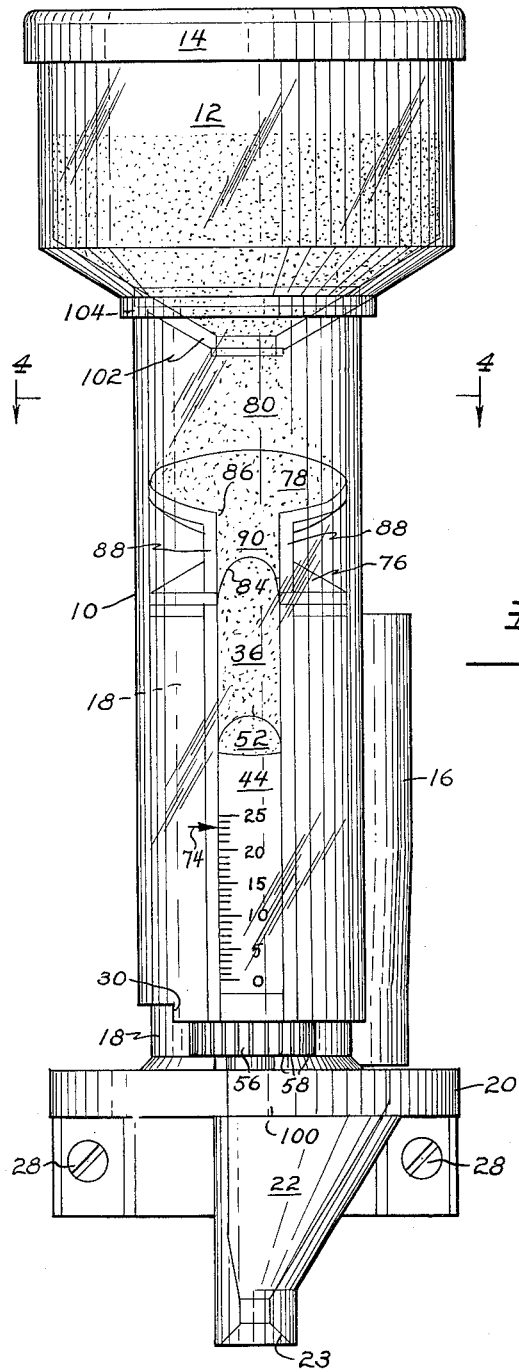

Dec. 19, 1961   B. GORDON ET AL   3,013,698
POWDER DISPENSERS
Filed May 19, 1960   3 Sheets-Sheet 1

INVENTORS
BRYAN GORDON
BENTLY A. TOXVARD
BY Herbert M. Birch
ATTORNEY

Dec. 19, 1961  B. GORDON ET AL  3,013,698
POWDER DISPENSERS
Filed May 19, 1960  3 Sheets-Sheet 2
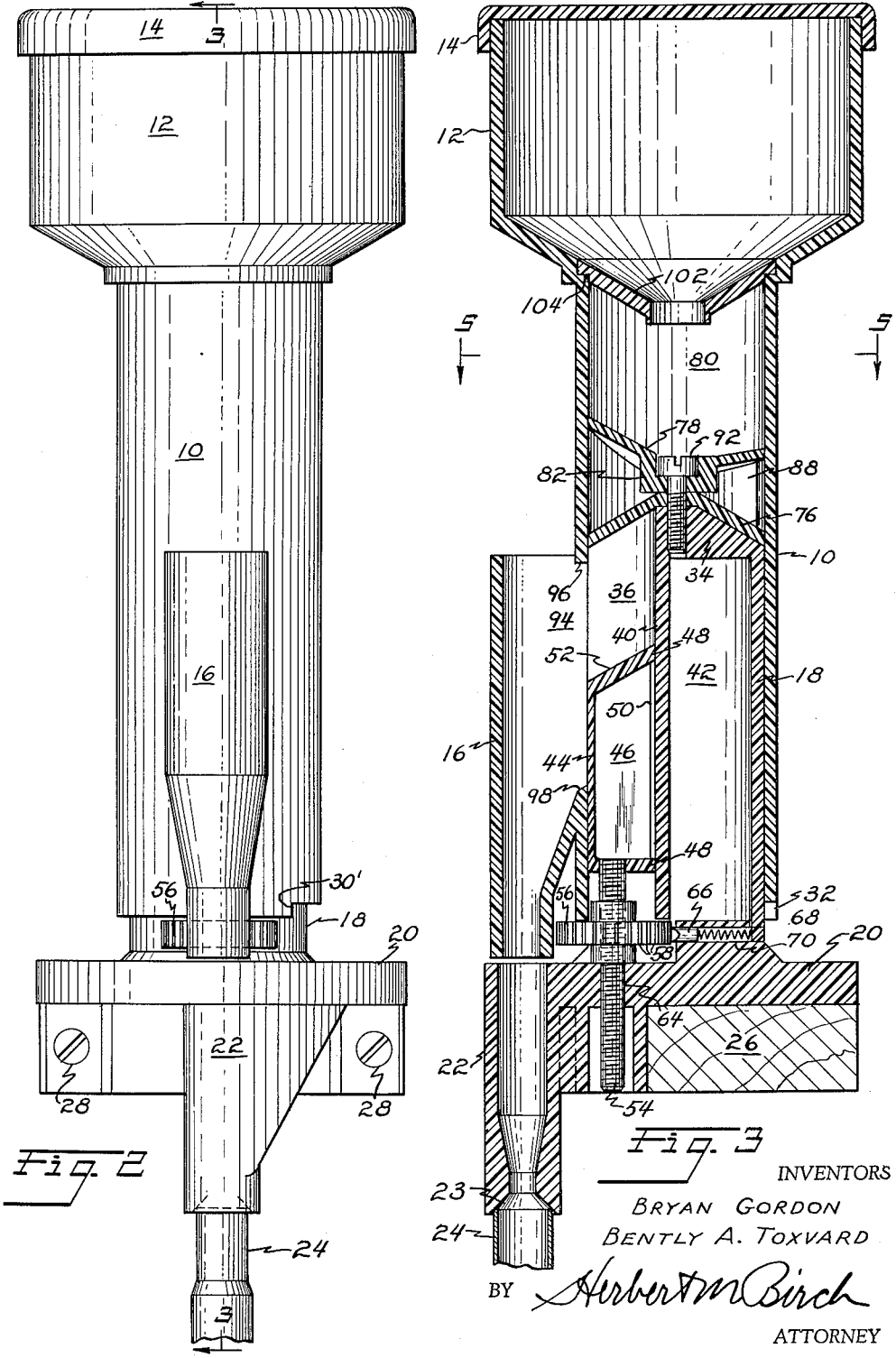
INVENTORS
BRYAN GORDON
BENTLY A. TOXVARD
BY Herbert M Birch
ATTORNEY Dec. 19, 1961  B. GORDON ET AL  3,013,698
POWDER DISPENSERS
Filed May 19, 1960  3 Sheets-Sheet 3
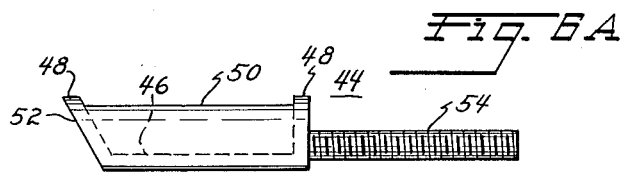
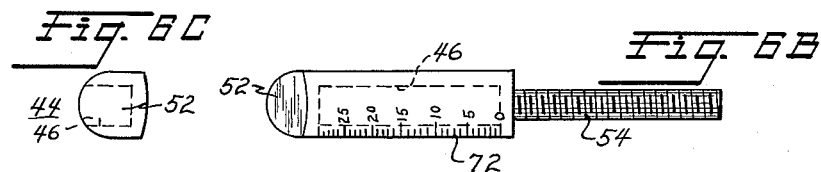
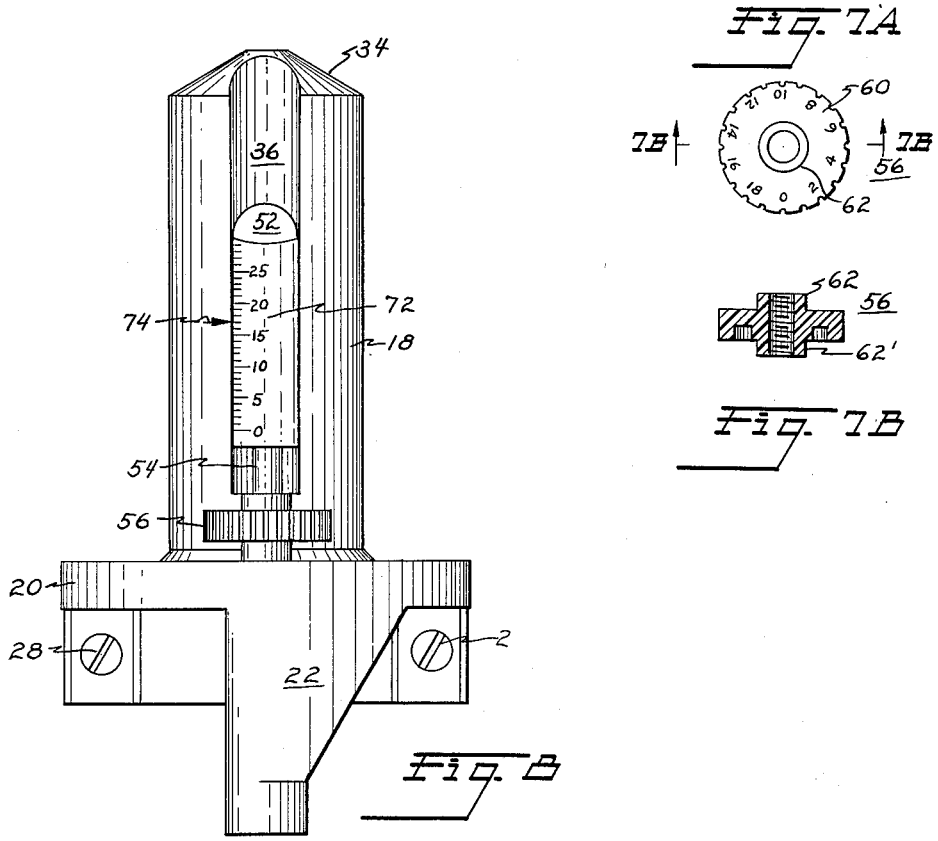
INVENTORS
BRYAN GORDON
BENTLY A. TOXVARD
BY Herbert M. Birch
ATTORNEY

United States Patent Office 3,013,698
Patented Dec. 19, 1961

3,013,698
POWDER DISPENSERS
Bryan Gordon, 4613 Duke St., Alexandria, Va., and
Bently Alling Toxvard, Box 89, Berryville, Va.
Filed May 19, 1960, Ser. No. 30,368
16 Claims. (Cl. 222—158)

This invention relates generally to devices for dispensing highly accurate measured charges of granular or powdered materials. More specifically, the invention is directed to a powder measure for smokeless powders used in rifle, shotgun and pistol cartridges peculiarly adapted to the art of "handloading" these cartridges to a degree of accuracy heretofore unattainable.

It is, therefore, an object of this invention to provide a highly accurate dispensing means for powdered or granular materials having a measuring chamber which is variable in volume but completely fixed in position throughout the charge forming and dispensing operation.

Another object of this invention is to provide a dispensing means for powdered or granular materials wherein the material to be dispensed is in full view at all stages of the charge forming and dispensing operation.

Another object of this invention is to provide a highly accurate dispensing means for powdered or granular materials entirely constructed of non-corrosive, non-conductive and completely transparent or translucent materials.

Still another object of this invention is to provide a dispensing means for powdered or granular materials wherein all of the chambers in said means are provided with access openings readily usable without dismantling of any part thereof.

Still another object of this invention is to provide a dispensing means for powdered or granular materials wherein the charge in the measuring chamber is dispensed through one side thereof rather than through the bottom.

Still another object of this invention is to provide a dispensing means for powdered or granular materials having a sleeve type dispensing valve adapted to control the discharge of material from a fixed measuring chamber.

Still another object of this invention is to provide a dispensing means for powdered or granular materials wherein immediately prior to the actual dispensing of the charge in the measuring chamber the upper end of the chamber is isolated from the material reservoir by a positive shearing action which does not disturb the material in the chamber but which will accurately sever fractional parts of individual granules or the like to prevent an excess of material from being dispensed.

A further object of this invention is to provide a dispensing means for powdered or granular materials having an adjusting means for micrometrically varying the volume of the stationary charge measuring chamber which requires an adjusting movement only without the necessity of set screws or the like to maintain the adjustment.

A further object of this invention is to provide a dispensing means for powdered or granular materials having a material reservoir comprising an enlarged upper section and a smaller lower section separated by a readily removable baffle whereby the weight of material acting to fill the stationary measuring chamber is substantially the same regardless of the amount of material in the upper section of the reservoir.

These and other objects of this invention will become apparent by reference to the following detailed description and drawings.

Figure 4:
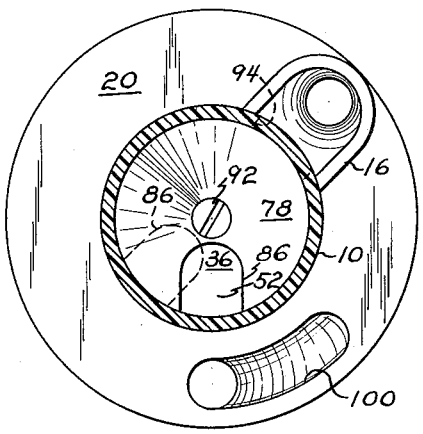
Figure 5:
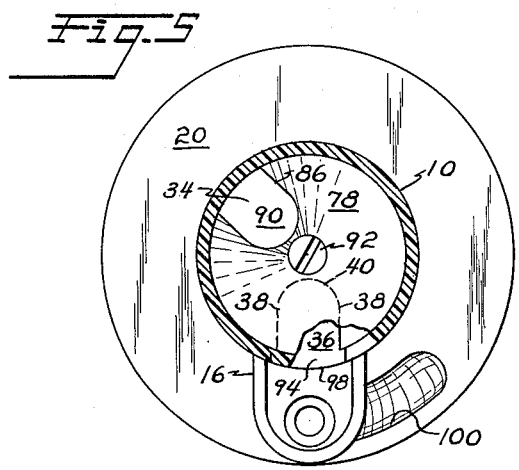

In the drawings:
FIGURE 1 is a front elevation of the invention in the non-dispensing or measured charge forming position;
FIGURE 2 is a front elevation of the invention in the measured charge dispensing position;
FIGURE 3 is a cross-section taken on line 3—3 of FIGURE 2;
FIGURE 4 is a cross-section taken on line 4—4 of FIGURE 1 with a dotted line indication of the cooperation between the upper edge of the measuring chamber shown therein and the means for isolating that chamber from the reservoir;
FIGURE 5 is a cross-section taken on line 5—5 of FIGURE 3 showing the cooperation during the charge dispensing operation of the sleeve valve and measuring chamber;
FIGURES 6A, 6B and 6C are side, front and top elevations, respectively, of a detail of the invention;
FIGURES 7A and 7B are top elevations and cross sections respectively, of a detail of the invention; and
FIGURE 8 is a front elevation of a detail of the invention.

Referring now in detail to the drawings in which the same numerals are used to represent the same parts in the various figures, the dispenser is shown in FIGURES 1 and 2 as comprising a rotatable outer cylindrical sleeve 10 integral with an enlarged upper section 12. A removable cap 14 is provided for closing the top of the enlarged upper section 12.

Generally parallel to the longitudinal axis of the rotatable sleeve 10 and integral therewith is a flow directing discharge chute 16. The non-dispensing position of the discharge chute 16 is shown in FIGURE 1 while in FIGURES 2 and 3, the chute 16 is shown in the material dispensing position.

Referring also to FIGURE 3, the outer rotatable sleeve 10 is mounted concentrically on an internal cylinder 18. The cylinder 18 is mounted on a base section 20 which includes a second discharge guide chute 22 to be further described.

In both FIGURES 2 and 3, a cartridge case 24 or other desired receptacle is shown in material receiving position in juxtaposition with the lower end of the second discharge guide chute 22. The lower end of the chute 22 is provided with a re-entrant conical opening 23 whereby a variety of cartridge neck sizes may be properly received thereby.

The base section 20 is shown in FIGURE 3 as being adapted to fit over the squared corner of a bench member 26. The fastening means which attach the base 20 to the bench 26 are screws 28 or the like shown in FIGURES 1 and 2.

The rotatable outer sleeve 10 has, at its lower extremity, a cut out section which forms a pair of stop lugs 30 and 30' thereon, one of each shown in FIGURES 1 and 2 respectively. These stop lugs 30 and 30' cooperate with a detent 32 extending outward from the exposed lower surface of the inner cylinder 18, as shown in FIGURE 3. The arcuate distance between the detents 30 and 30' limits the amount of rotation of the outer sleeve 10 and thus, provides an indexing means for the charge measuring position of FIGURE 1 and the charge dispensing position of FIGURES 2 and 3. When the dispenser is in the charge measuring position of FIGURE 1, stop lug 30' is in contact with the detent 32 on the inner cylinder 18. In the discharge or charge dispensing position of FIGURES 2 and 3, the outer sleeve 10 has been rotated such that the stop lug 30 is in contact with the detent 32.

Referring to FIGURES 1, 3 and 8, the inner cylinder 18 comprises a cylindrical body as shown having a truncated upper end portion 34. A longitudinal cavity 36, hereinafter called the charge measuring chamber 36, is formed in the cylinder 18 extending from one end to the other and from the periphery of the cylinder 18 radially inward to a point adjacent the central longitudinal axis of the cylinder. The measuring chamber is shown by the dotted line indication in FIGURE 5 to comprise a cavity with flat side walls 38 and a substantially semi-cylindrical inner boundary 40.

A hollow cavity 42 is located within the inner cylinder 18 opposite the charge measuring chamber 36 but may also be a solid section if desired.

Variable charge setting

Means must now be provided for adjusting the volume of the charge measuring chamber 36 to selectively regulate the amount of powdered or granular material to be dispensed therefrom.

Referring to FIGURES 3, 6, 7 and 8 a slug 44 having the same cross sectional shape and size as the measuring chamber 36 and having a length at least as long as the maximum usable length of the measuring chamber 36 is slidably mounted therein. Substantially all of the peripheral boundary of the slug 44 contains a cut-out portion 46 between two arcuate end members 48. This provides a tight contact with the inner wall 40 of the measuring chamber 36 by way of the arcuate end flanges 48 but with a reduced resistance to the sliding adjustment of the slug 44. The cut-out portion 46 is bounded at the front of the slug 44 by a pair of longitudinal flanges 50 extending between the arcuate end flanges 48.

The upper end of the slug 44 comprises a sloping flat surface 52 for a purpose to be hereinafter described.

Integral with the lower end of the slug 44 is a longitudinally extending calibration screw 54. The calibration screw 54 is threaded through a micrometer type adjusting nut 56 shown in detail in FIGURES 7A and 7B.

The adjusting nut 56 is cylindrical in shape with a plurality of longitudinally disposed grooves 58 cut in the periphery thereof. A plurality of calibrations may be printed on the upper surface 60 of the cylindrical portion of the adjusting nut 56 as shown in FIGURE 7A.

In FIGURE 7B, vertically extending flanges 62 and 62' concentric with the threaded central aperture 64 of the adjusting nut 56 extend upwardly and downwardly, respectively. As shown in FIGURE 3, the lower flange 62' acts as a bearing to support the adjusting nut 56 on the upper surface of the base 20 concentric with the hole 64 bored therethrough to receive the adjusting screw 54.

The volume adjustment of the measuring chamber 36 in the inner cylinder 18 may now be made by turning the adjusting nut 56 in the desired direction to cause the adjusting screw 54 and the slug 44 to travel up or down and change the volume of the measuring chamber.

In FIGURES 3 and 8 is shown the means by which the adjustment may be indexed and maintained throughout any given set of dispensing operations. A spring biased pawl or spring detent 66 biased by a compression spring 68, both of which are contained in a slot 70 in the base 20, engages with the lands intermediate each of the longitudinal grooves 58 in the adjusting nut 56. This provides a micrometer type "click" adjustment which by either sound or touch gives an incremental indication of the degree of each adjustment in the volume of the measuring chamber 36.

In FIGURES 6B and 8, the slug 44 is shown as having a series of index marks 72 thereon which with a reference index 74 on the surface of the inner cylinder 18 (FIGURE 8) provide a readable indication through the transparent outer sleeve 10 (FIGURE 1) of the volume adjustment of the charge measuring chamber 36.

Measuring chamber charging and discharging means

With the inner cylinder 18 and the base 20 of the dispensing means assembled as shown by FIGURES 3 and 8, the upper surface of the truncated conic portion 34 of the inner cylinder 18 forms a bearing surface for receiving a matched contour bearing 76 fixed to the inner periphery of the outer rotating sleeve 10.

As shown by FIGURES 1 and 3, a contoured plate 78 is integrally connected to the upper side of the conical bearing 76 to form the bottom of the lower chamber 80 in the material reservoir generally indicated at 12 in the upper part of the rotatable sleeve 10. The contoured plate 78 and the conical bearing 76 are juxtaposed through a common center section 82.

Both the bearing 76 and the plate 78 have matching slots 84 and 86, respectively, cut therein in register one with another. The peripheral boundaries of these slots are cut to match the contour of the charge measuring chamber 36 in the inner cylinder 18. These peripheral boundaries of the slots 84 and 86 are joined together throughout their entirety by a vertically disposed web 88. Thus, the web 88 and the shape thereof as defined by the peripheral boundaries of the slots 84 and 86 in the bearing 76 and plate 78, respectively, form an extension 90 (FIGURE 1) of the charge measuring chamber 36.

The entire rotatable sleeve assembly 10 is rotatably mounted on the upper conic portion 34 of inner cylinder 18 and on the bearing 76 of the sleeve 10 by means of a pivot screw 92 extending through the common center section 82 of the contoured plate 78 and bearing 76 and into the upper conic portion 34 of the inner cylinder 18.

The pivotal mounting of the sleeve 10 and thus, the extension 90 of the measuring chamber 36 contained therein, permits the measuring chamber 36 to be closed by rotating the sleeve 10 and causing the extension 90 of the measuring chamber 36 to move out of registry with the rest of the chamber.

Referring to FIGURES 4 and 5, the charge measuring and charge dispensing positions, respectively of the dispenser are shown. When the sleeve 10 and discharge chute are rotated to the charge measuring position of FIGURE 4, the measuring chamber 36 is in registry with its extension 90 allowing the chamber 36 to fill with the material contained in the reservoir. As rotation of the sleeve 10 is commenced to effect a discharge of the measured charge of material, the action of the shaped periphery of the slots 84 and 86 (indicated by 86) of the chamber extension 90 is shown by the dotted line indication thereof. As shown, the contoured edges of the slots and the upper edge of the chamber 36 provide a scissors or shearing action to cut any granules of material partially enclosed in the chamber 36 whereby an accurate volumetric measurement of charge is accomplished. At the same time, the shearing action completely eliminates the need for any relatively strong application of force to effect rotation of the sleeve 10 and cut through any resisting granules of material which may be protruding from the measuring chamber 36 into the extension 90 thereof.

As shown in FIGURES 3, 4 and 5, the discharge chute 16 is attached to the sleeve 10 adjacent a generally rectangular discharge opening 94 therein bounded by an upper edge 96 and a lower edge 98 (FIGURE 3) in the sleeve 10. The size of the discharge opening 94 is equal to or slightly larger than the maximum usable dimension of the charge measuring chamber 36 so that the full range of charges measured thereby may be properly dispensed.

When the discharge chute 16 is in the discharge position of FIGURES 2, 3 and 5, the lower end thereof is in direct communication with the upper open end 100 of the second discharge chute 22 in the base 20. The open end 100 of the second discharge chute 22 extends for a substantial arcuate distance around the base 20 in line with the arc described by the motion of the main discharge chute 16 whereby spillage is avoided due to the progressive material discharge action now to be described.

The approach to the discharge position of the sleeve 10 and its integrally mounted main discharge chute 10 progressively moves the extension 90 of the measuring chamber 36 to the position of FIGURE 5 and simultaneously causes the discharge opening 94 in the sleeve 10 within the discharge chute 16 to progressively register with the outer boundary of the charge measuring chamber 36. This allows the powder or the like contained therein to discharge through the main and second discharge chutes 16 and 22, respectively. The slanted upper surface 52 on the volume adjusting slug 44 acts to completely discharge all of the material in the chamber by gravity feed.

The accuracy of the dispensing means is materially affected by change in the weight of the powder in the reservoir immediately above the slot 86 in the contoured feed plate 78. In order to keep the acting weight of the material substantially constant, a removable baffle 102 (FIGURES 1 and 3) in the shape of a funnel is provided between the larger upper reservoir 12 and the smaller lower reservoir 80. The baffle 102 is so shaped at its edge as to be received by a counter-sunk rim 104 in the orifice between the upper and lower reservoirs 12 and 80, respectively.

Operation

The operation of the powder dispensing means will now be described in conjunction with the steps necessary to deliver a predetermined powder charge to each of a plurality of cartridge cases of the same caliber.

The cap 14 on the upper reservoir 12 is first removed and the desired type of powder for the particular cartridge to be loaded is poured into the upper reservoir 12. The pouring is continued until sufficient powder flows through the baffle 102 to fill the lower reservoir 80 as well as the upper reservoir 12.

Referring now to FIGURES 1, 2, 3 and 8, the micrometer adjustment of the slug 44 within the charge measuring chamber 36 is now made by rotating the adjusting nut 56 in the desired direction. This causes the calibration screw 54 to move the slug 44 up or down in the chamber depending on the direction of rotation of the adjusting nut 56.

The change in the volume of the charge measuring chamber 36 is determined by the desired weight of powder to be dispensed. Once the volume adjustment for a particular weight of a particular powder is known, the use of the index marks 72 and 74 on the cylinder 18 and slug 44, respectively, and the audible or otherwise sensible click adjustment effected by the action of the spring biased pawl 66 acting in the grooves 58 in the adjusting nut 56 make an accurate adjustment possible with respect to the exact slug position required. In a preferred embodiment of the invention each click adjustment has been designed to move the slug 44 a distance of two-and-one-half thousandths (2½/1000) of an inch in the chamber 36. Visual readout of the number of clicks may be had by referring to the index numerals on the upper surface 60 of the adjusting nut 56 as shown in FIGURE 7A.

The next step is to rotate the outer sleeve 10 and consequently the main discharge chute 16 and the extension 90 of the charge measuring chamber 36 to the position shown by FIGURES 1 and 4. This brings the charge measuring chamber 36 into direct alignment with the extension 90 thereof and into communication with the lower reservoir 80.

When the sleeve 10 is rotated to this position, the powder in the lower reservoir 80 flows by gravity down the contoured feed plate 78 and through the measuring chamber extension 90 to fill the entire measuring chamber 36. This entire flow of powder is visually observed due to the transparent and/or transluscent material of which the entire dispensing means is constructed.

As shown by FIGURES 2 and 3, the cartridge case 24 is placed with its open end in contact with the inner surface of the re-entrant outlet opening 23 in the second or lower discharge chute 22.

The sleeve 10 is now rotated from the position of FIGURE 1 wherein the limit stop 30′ is in contact with the detent 32 on the inner cylinder 18 to the position shown in FIGURES 2, 3 and 5 wherein the limit stop 30 is in contact with the detent 32.

As the rotation progresses from one end position to another, the rectangular valve opening 94 in the outer sleeve 10 progressively opens the side of the chamber 36 whereby the powder therein flows down the sloping upper surface 52 of the slug 44 into the main discharge chute 16. Simultaneously, the powder flowing out the lower end of the chute 16 is directed by means of the arcuate discharge assisting slot 100 in the base 20 to the second discharge chute 22 from whence it is delivered to the cartridge case 24.

The cartridge case 24 is removed only when it is visually apparent that the entire measured charge of powder has been completely dispensed through all of the transparent discharge chutes to the cartridge case 24.

To repeat the operation for additional cartridges, the sleeve 10 need only be rotated to the position of FIGURE 1 whereby the same measured charge will be delivered from the reservoir to the chamber 36.

An important feature of the invention will now be further described. When the sleeve 10 is returned to the position of FIGURES 2 and 3 the shape of the edges 84 and 86 of the measuring chamber extension 90 and the shape of the upper edge of the measuring chamber 36 provides a shearing action between the cooperating lower and upper edges respectively of the extension chamber 90 and the main chamber 36 as shown by the dotted line and solid line indication labelled with the numeral 86 in FIGURE 4. This easily and accurately cuts any individual granules of powder in excess of the amount desired to be measured by the chamber 36 while the rotation of the parts proceeds to isolate the chamber 36 from the lower reservoir 80. Continued rotation of the sleeve 10 to the position of FIGURES 2 and 3 causes the same measured charge of powder to be dispensed to the next and subsequent cartridge cases as the cycle of operation is repeated.

As disclosed and shown by the foregoing description and drawings, this invention satisfies a long felt need in the art for a trouble free, readily adjustable, accurate and accessible powder dispenser.

The use of clear plastic or other synthetic materials provides a dispenser wherein each and every step in the dispensing cycle may be observed. The result of this ready observation of all steps is to eliminate all error in measuring a dispensed charge by being able to spot difficulties before they affect the final result.

All of the components of this invention are readily accessible without disassembly of the device so that once the difficulty has been located it may be readily corrected.

The resulting accuracy of each measured charge has been made possible by this invention to a degree heretofore unattainable in the art.

Finally, the ease with which excess granules are cut during the dispensing cycle has heretofore been unattainable in the art.

It is to be understood that the invention defined herein has been described in conjunction with a preferred embodiment thereof and is not intended to limit the scope of the appended claims.

We claim:

1. Means for dispensing measured charges of powdered or granular material comprising, fixed inner means, outer means enclosing said fixed inner means and movable relative thereto, a variable volume charge measuring chamber in said fixed inner means, a reservoir in said outer means, and an extension of said charge measuring chamber in said outer means selectively coextensive with said charge measuring chamber and acting as an outlet for said reservoir, whereby said reservoir may be selectively connected with said charge measuring chamber.

2. The invention defined in claim 1 wherein said fixed inner means, said movable outer means, said charge measuring chamber, said reservoir and said extension of said charge measuring chamber are all constructed of transparent material.

3. The invention defined in claim 1 wherein said reservoir comprises an enlarged upper section, a smaller lower section including an outlet, and a removable baffle mounted between said upper and lower sections whereby the weight of material acting on the outlet in the lower section is substantially the weight of the material in said lower section of said reservoir.

4. Means for dispensing measured charges of powdered or granular material comprising, fixed inner means, outer means enclosing said fixed inner means and movable relative thereto, a variable volume vertical charge measuring chamber in said fixed inner means, a base member integral with said fixed inner means; volume varying means for said measuring chamber comprising, a sliding slug mounted in said measuring chamber for vertical sliding movement therein, a depending calibration screw integral with said slug and extending through said base, an adjusting nut supported by said base and receiving said screw, and a micrometer click adjustment means in cooperation with said nut for selecting and maintaining an adjusted position of said slug; a reservoir in said outer means, and an extension of said charge measuring chamber in said outer means selectively coextensive with said charge measuring chamber and acting as an outlet for said reservoir, whereby said reservoir may be selectively connected with said charge measuring chamber.

5. The invention defined in claim 4 wherein said slug and said calibration screw are made of translucent material and said inner means, outer means, reservoir and adjusting nut are transparent.

6. Means for dispensing measured charges of powdered or granular material comprising, fixed inner means, outer means enclosing said fixed inner means and movable relative thereto, a variable volume charge measuring chamber in said fixed inner means, a reservoir in said outer means, an extension of said charge measuring chamber in said outer means selectively coextensive with said charge measuring chamber and acting as an outlet for said reservoir whereby said reservoir may be selectively connected with said charge measuring chamber, a discharge chute mounted externally of said outer means, and a discharge port through said outer means internally disposed with respect to said discharge chute, said outer means comprising a side wall of said measuring chamber, said discharge port being progressively movable with said outer means into registry with said variable volume charge measuring chamber, whereby said side wall formed by said outer means is removed and the contents of said measuring chamber are dispensed through said port and said discharge chute.

7. Means for dispensing measured charges of powdered or granular material comprising, fixed inner means, outer means enclosing said fixed inner means and movable relative thereto, a variable volume charge measuring chamber in said fixed inner means, a reservoir in said outer means, an extension of said charge measuring chamber in said outer means selectively coextensive with said charge measuring chamber and acting as an outlet for said reservoir whereby said reservoir may be selectively connected with said charge measuring chamber, a discharge chute mounted externally of said outer means, and a discharge port through said outer means internally disposed with respect to said discharge chute, said outer means comprising a side wall of said measuring chamber, said discharge port being progressively movable with said outer means into registry with said variable volume charge measuring chamber, whereby said side wall formed by said outer means is removed and the contents of said measuring chamber are dispensed through said port and said discharge chute; a base member integral with said fixed inner means and supporting both said inner and outer means, and a second discharge chute open at both ends integral with said base, the open upper end of said second chute being elongated and disposed along the path of motion of the first mentioned discharge chute whereby during the period when said discharge port is progressively moving into registry with said measuring chamber, the contents of said chamber being dispensed through said first chute will all be received by said second chute.

8. Means for dispensing measured charges of powdered or granular material comprising, a base, a vertically disposed cylinder integral with said base, a frustro-conical upper section on said cylinder, a vertical charge measuring chamber extending from the periphery of said cylinder radially inward thereof and longitudinally thereof having parallel side walls and a semi-cylindrical inner wall, the upper edge of said cylinder being coincident with the surface of said frustro-conical section, a rotatable sleeve forming the outer wall for said charge measuring chamber concentric with said cylinder and supported thereon by a bearing surface coextensive with said surface of said frustro-conical section of said cylinder, said bearing surface being formed in a horizontally disposed internal web integral with said sleeve, a contoured feed plate vertically adjacent the upper surface of said horizontally disposed web, radially disposed slots in the peripheries of said horizontally disposed web and said feed plate joined by a shaped vertical web whereby an extension of the charge measuring chamber is formed therein which may be selectively placed in registry with the upper edge of said charge measuring chamber by rotating said sleeve; a reservoir in said sleeve above said feed plate and including said feed plate as the lower boundary thereof, a discharge opening in said sleeve of the same size as said charge measuring chamber adapted when said sleeve is rotated to register with said measuring chamber and permit the material therein to discharge therefrom; said sleeve being indexed between first and second positions of rotation such that: in said first position said discharge opening is out of registry with said charge measuring chamber and said charge measuring chamber is in position to be filled with material from said reservoir through said extension of said charge measuring chamber, in said second position said discharge opening is in complete registry with said charge measuring chamber and said extension of said charge measuring chamber is out of registry therewith such that the material in said charge measuring chamber may be dispensed, and in the rotation of said sleeve and said extension of said measuring chamber from said first position to said second position the movement of the lower edge of said extension of said measuring chamber past the upper edge of said measuring chamber creates a shearing action whereby excess particles of material overflowing said charge measuring chamber are cut and carried out of registry therewith along the said surface of the frustro-conical section of said cylinder to leave in said charge measuring chamber a charge of material of a pre-determined volume.

9. The invention defined in claim 8 wherein said charge measuring chamber includes a vertically slidable shaped slug therein for selectively adjusting the volume of said chamber.

10. The invention defined in claim 9 wherein said slug comprises a body portion shaped to conform to said chamber having an upper end sloping outwardly and downwardly thereof whereby said sloped upper end acts to assist the discharge of material from said chamber when said discharge opening in said sleeve is brought into registry therewith.

11. The invention defined in claim 8 including means for indexing said rotatable sleeve between said first and second positions of rotation comprising, a detent integral with said vertical cylinder and extending outward therefrom, and a dependent sector extending partially around the circumference of the lower end of said sleeve having a stop at either end thereof, each adapted to come into juxtaposition with said detent at one or the other positions of rotation, respectively.

12. Means for dispensing measured charges of powdered or granular material comprising, fixed inner means, outer means enclosing said fixed inner means and movable relative thereto, a variable volume charge measuring chamber in said fixed inner means, a reservoir in said outer means, and an extension of said charge measuring chamber in said outer means selectively coextensive with said charge measuring chamber and acting as an outlet for said reservoir, whereby said reservoir may be selectively connected with said charge measuring chamber, said charge measuring chamber and said extension thereof having cooperating juxtaposed edges so shaped and so proportioned as to effect a progressive shearing action therebetween when said extension of said charge measuring chamber is moved from a position in registry with said charge measuring chamber to a position out of registry therewith.

13. The invention as defined in claim 6 wherein said fixed inner means, said movable outer means, said charge measuring chamber, said reservoir and said extension of said charge measuring chamber are all constructed of transparent material.

14. The invention as defined in claim 6 wherein said reservoir comprises an enlarged upper section, a smaller lower section including an outlet, and a removable baffle mounted between said upper and lower sections whereby the weight of material acting on the outlet in the lower section is substantially the weight of the material in said lower section of said reservoir.

15. The invention defined in claim 12 wherein said fixed inner means, said movable outer means, said charge measuring chamber, said reservoir and said extension of said charge measuring chamber are all constructed of transparent material.

16. The invention as defined in claim 12 wherein said reservoir comprises an enlarged upper section, a smaller lower section including an outlet, and a removable baffle mounted between said upper and lower sections whereby the weight of material acting on the outlet in the lower section is substantially the weight of the material in said lower section of said reservoir.

References Cited in the file of this patent

UNITED STATES PATENTS

| | | |
|---|---|---|
| 217,628 | Marks et al. | July 15, 1879 |
| 987,211 | Bender et al. | Mar. 21, 1911 |
| 1,560,824 | Karraz et al. | Nov. 10, 1925 |
| 2,044,489 | Karlsson-Ygger | June 16, 1936 |